(12) United States Patent
Le Borloch et al.

(10) Patent No.: US 11,884,379 B2
(45) Date of Patent: Jan. 30, 2024

(54) CONTROL SYSTEM FOR A HIGH LIFT AIRCRAFT ASSEMBLY

(71) Applicant: DASSAULT AVIATION, Paris (FR)

(72) Inventors: Jérôme Le Borloch, Saint-Cloud (FR); François Pineau, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 17/724,653

(22) Filed: Apr. 20, 2022

(65) Prior Publication Data

US 2022/0340261 A1 Oct. 27, 2022

(30) Foreign Application Priority Data

Apr. 21, 2021 (FR) ..................................... 21 04148

(51) Int. Cl.
| | | |
|---|---|---|
| *B64C 13/04* | (2006.01) | |
| *G05G 1/015* | (2008.04) | |
| *G05G 1/04* | (2006.01) | |
| *G05G 5/00* | (2006.01) | |
| *G05G 5/05* | (2006.01) | |

(52) U.S. Cl.
CPC ........... *B64C 13/042* (2018.01); *G05G 1/015* (2013.01); *G05G 1/04* (2013.01); *G05G 5/005* (2013.01); *G05G 5/05* (2013.01); *G05G 2505/00* (2013.01)

(58) Field of Classification Search
CPC ...... B64C 13/042; G05G 1/015; G05G 5/005; G05G 2505/00
See application file for complete search history.

(56) References Cited

U.S. PATENT DOCUMENTS

| | | | | |
|---|---|---|---|---|
| 9,193,438 | B2 * | 11/2015 | Lebernicheux | ......... B64C 13/18 |
| 10,216,167 | B1 | 2/2019 | Ankney | |
| 2007/0164996 | A1 * | 7/2007 | Gould | ..................... G05G 5/005 |
| | | | | 345/161 |
| 2010/0078525 | A1 * | 4/2010 | Kummle | ............. B64C 13/0425 |
| | | | | 244/236 |
| 2014/0157943 | A1 | 6/2014 | Diehl | |

(Continued)

FOREIGN PATENT DOCUMENTS

| | | |
|---|---|---|
| CN | 101962074 A | 2/2011 |
| EP | 2130764 A2 | 12/2009 |

(Continued)

OTHER PUBLICATIONS

Search Report for priority application FR 2104148.

*Primary Examiner* — Vicky A Johnson

(74) *Attorney, Agent, or Firm* — Davidson, Davidson & Kappel, LLC

(57) ABSTRACT

A control system is for a high lift assembly of an aircraft. The assembly is controllable in two aerodynamic configurations each with different lift. The control system includes a manual control device operable by a pilot of the aircraft. The manual control device includes at least one member movable relative to a base body. The movable member can be moved relative to the base body between a rest position, a first position and a second distinct position. The manual control device includes a resilient return device for the movable member in the rest position. The manual control device issues a signal when the movable member reaches either the first or second position, to move the high lift assembly between two of the aerodynamic configurations.

20 Claims, 4 Drawing Sheets

(56) References Cited

U.S. PATENT DOCUMENTS

2018/0107235 A1\* 4/2018 Smith .................... G05G 9/047
2018/0155008 A1 6/2018 Le Borloch

FOREIGN PATENT DOCUMENTS

| EP | 3643604 A1 | 4/2020 |
| EP | 3670330 A1 | 6/2020 |
| FR | 3058807 A1 | 5/2018 |

\* cited by examiner

CONTROL SYSTEM FOR A HIGH LIFT AIRCRAFT ASSEMBLY

The present disclosure relates to a control system for a high lift assembly comprising at least one trailing edge flap of an aircraft, the high lift assembly being capable of being controlled in at least two different aerodynamic configurations of different lift, the control system comprising a manual control device, operable by a pilot of the aircraft, the manual control device comprising at least one movable member and a base body, the member being movable relative to the base body.

BACKGROUND

The high lift assembly, e.g. slats/flaps, can be deployed in several aerodynamic configurations, which form different slat/flap steering angle combinations.

These configurations are deployed according to the aircraft's flight phase (take-off, cruise, approach, landing, etc.). For example, these configurations are known by the abbreviations SF0, SF1, SF2, SF3 (S for Slats and F for Flaps).

A known control system for such a high-lift assembly comprises a joystick with a control lever, which is placed in particular on the pedestal between the two pilots in the cockpit of the aircraft.

The lever can be moved to several positions, each position corresponding to one of the configurations. The desired configuration is thus controlled by positioning the lever in front of the associated marker, which then locks into position.

It is also known to provide a control unit interposed between the lever and the slat and flap actuators, the control unit including control laws suitable for controlling the slat and flap actuators as a function of the position of the lever and other criteria. These other criteria include, for example, the current speed, whereby the control laws may, for example, be flap and/or slat extension prohibitions depending on the current speed.

It is also now possible for the control laws of the control unit to automatically control the slat and flap actuators, regardless of the position of the lever. However, such an autopilot can lead to an inconsistency from the pilot's point of view between the lever position (and thus the configuration chosen by the pilot) and the configuration actually commanded by the control unit.

SUMMARY

It is therefore an aim of the present disclosure to provide a solution that avoids pilot confusion in the control of an aircraft's high-lift assembly, particularly in the presence of automatic functions acting on the configuration.

To this end, the present disclosure provides to a control system of the aforementioned type, wherein the movable member is suitable for being moved relative to the base body at least between a rest position and a distinct first position and second position, the manual control device comprising a device for resiliently returning the movable member to the rest position, the manual control device being suitable for emitting at least one signal representative of the position reached by the movable member with respect to the base body, when the movable member reaches either the first or second position, in order to cause the high lift assembly to move between two of the aerodynamic configurations.

The control system according to the present disclosure may comprise one or more of the following features, taken alone or in any combination that is technically possible:
- the high lift assembly comprises at least one trailing edge flap and/or at least one leading edge slat of the aircraft;
- the control system comprises a lift control unit, the lift control unit being connected to the high lift assembly and to the manual control device, the lift control unit being configured to generate at least one lift control vector of the high lift assembly, the lift control vector being generated from at least one lift control law, the control law having as input data at least each signal received from the manual control device;
- the control system further comprises a sensor system for flight parameters of the aircraft, the lift control unit being connected to the sensors of the sensor system, the control law also having as input data signals received from the sensors of the sensor system;
- the high lift assembly is adapted to be controlled into at least three different aerodynamic configurations having different increasing lift; the manual control device being configured, when the movable member reaches the first position from the rest position, to emit at least one signal representative of reaching the first position to switch the high lift assembly from a current aerodynamic configuration to another of the aerodynamic configurations having a lift greater than the current aerodynamic configuration; and the manual control device being configured, when the movable member reaches the second position from the rest position, to emit at least one signal representative of reaching the second position to switch the high lift assembly from a current aerodynamic configuration to another of the aerodynamic configurations having a lift less than the current aerodynamic configuration;
- the manual control device is a joystick and the movable member is a lever, the base body defining a guide groove and the lever comprising a handle and a guide body on which the handle is mounted, the guide body of the lever comprising a guide finger received in the guide groove;
- the manual control device comprises a device for locking the lever in the rest position, the locking device comprising a notch defined in the guide groove, the notch being adapted to receive the guide finger when the lever is in the rest position, the locking device also comprising a system for resiliently returning the guide finger into the notch;
- the first and second positions define stop positions for the movement of the movable member relative to the base body;
- the manual control device is a joystick and the movable member is a lever, the manual control device comprising, for each of the first and second positions, at least one magnet integral with either the lever or the base body, the magnet being adapted to exert an attractive force on a region of the other of the lever and the base body; the attractive force being less than a return force exerted by the resilient return device of the lever in the rest position;
- the manual control device comprises a system for detecting the movable member in a first position and a system for detecting the movable member in a second position, each detection system comprising a redundancy of at least two position sensors, each position sensor being capable of sending in parallel a signal representative of the position reached by the movable member with respect to the base body, when the movable member reaches either the first or second position;

the manual control device comprises a system for detecting the movable member in the rest position comprising at least one position sensor, preferably a redundancy of at least two position sensors, each position sensor being able to send in parallel a signal representative of the position reached by the movable member with respect to the base body, when the movable member reaches the rest position; the control unit being suitable for receiving and storing in a memory a succession of signals representative of the position reached by the movable member over time, and, when the unit receives two consecutive signals from the manual control device representative of the same position reached by the movable member, the control unit is configured so as not to take account of the second signal of the two consecutive signals, if no signal representative of the reaching of the rest position is interposed between the two consecutive signals;

the control unit is configured to send a signal representative of the generated control vector to the manual control device, the manual control device comprising a visual indication device adapted to present, to a pilot of the aircraft, a visual indication representative of the aerodynamic configuration controlled by the generated control vector;

the visual indication device of the manual control device comprises a plate integral with the base body, the movable member projecting past the plate, the plate having markings, each marking being respectively associated with one of the aerodynamic configurations and being able to pass between at least one illuminated on configuration and an off configuration, the visual indication device being able to present the said visual indication by commanding the passage of the marking, associated with the aerodynamic configuration controlled by the generated control vector, to the illuminated configuration;

the control unit is adapted to determine a completion of the transition of the high lift assembly to the controlled aerodynamic configuration, and each mark is further adapted to move to a transition on configuration, the visual indication device being adapted to control, after reception of a signal representative of the generated control vector, the transition of the associated mark from the off configuration to the transition on configuration; the visual indicating device being also adapted to control, after completion of the transition of the high lift assembly to the controlled aerodynamic configuration, the transition of the associated marker from the transitional on configuration to the illuminated off configuration; the transitional on configuration being a flashing configuration of each marker; and/or each marker is configured to emit a light intensity having a predetermined first colour in the illuminated on configuration and having a predetermined second colour distinct from the first colour in the transitional on configuration;

the visual indication device is adapted to present, after receiving a signal representative of the generated control vector, a visual indication representative of a direction of passage from the current aerodynamic configuration to the controlled aerodynamic configuration, to a pilot of the aircraft, for example by controlling the passage of at least one light from an off configuration to an on configuration;

the high lift assembly can be controlled to change from a current aerodynamic configuration to at least one other possible aerodynamic configuration, the control system further comprises a system of sensors for aircraft flight parameters, the lift control unit being connected to the sensors of the sensor system, the control unit being configured to determine, for each possible aerodynamic configuration, an authorisation or prohibition to change to the possible aerodynamic configuration as a function of signals received from the sensors of the sensor system; the manual control device comprising a visual indication device capable of presenting, to a pilot of the aircraft and for each possible aerodynamic configuration, at least one light representative of the determined authorisation or prohibition of passage to the possible aerodynamic configuration;

the movement of the movable member from the rest position to the first position defines a first direction of movement and the movement of the movable member from the rest position to the second position defines a distinct second direction of movement, preferably opposite to the first direction of movement;

the first and second positions define stop positions for the movement of the movable member relative to the base body;

each slat is movable relative to a wing of the aircraft between at least an approximate wing position and an extreme remote position and each flap is movable relative to a wing of the aircraft between at least an approximate wing position, an intermediate position and an extreme remote position; the high lift assembly being operable in at least three different aerodynamic configurations, the aerodynamic configurations including a low lift aerodynamic configuration in which each slat and flap is in the near position, an intermediate lift aerodynamic configuration in which each slat is in the far position and each flap is in the intermediate position, and a high lift aerodynamic configuration in which each slat and flap is in the far position; and the return system comprises at least one spring connected to the lever guide body and the base body.

Furthermore, the present disclosure provides an aircraft comprising the control system as described above.

Furthermore, the present disclosure advantageously provides a method of controlling a high lift assembly comprising at least one trailing edge flap of an aircraft comprising the following steps:

providing a control system as described above;

activating the manual control device by a pilot of the aircraft, by moving the movable member relative to the base body from the rest position to either the first or second position;

transmitting at least one signal representative of the position reached by the movable member relative to the base body, when the movable member reaches either the first or second position, to switch the high lift assembly between two of the aerodynamic configurations; and the resilient return of the movable member by the resilient return device from the reached position to the rest position.

BRIEF SUMMARY OF THE DRAWINGS

The present disclosure will be better understood upon reading the following description, given only as an example, and with reference to the attached drawings, in which.

DETAILED DESCRIPTION

Figure 1:
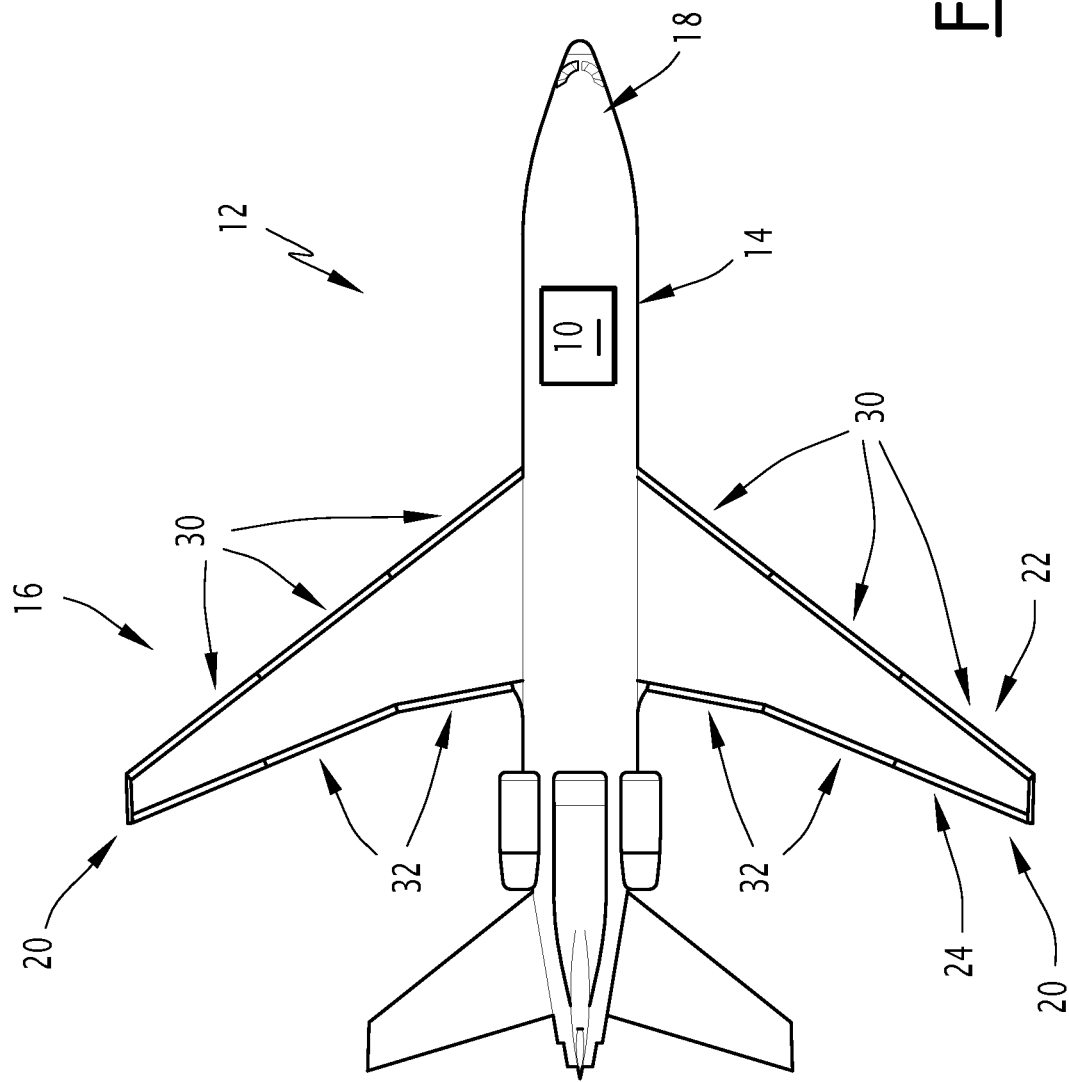
FIG. 1 is a schematic view of an aircraft comprising an example control system according to the present disclosure.
Figure 2:
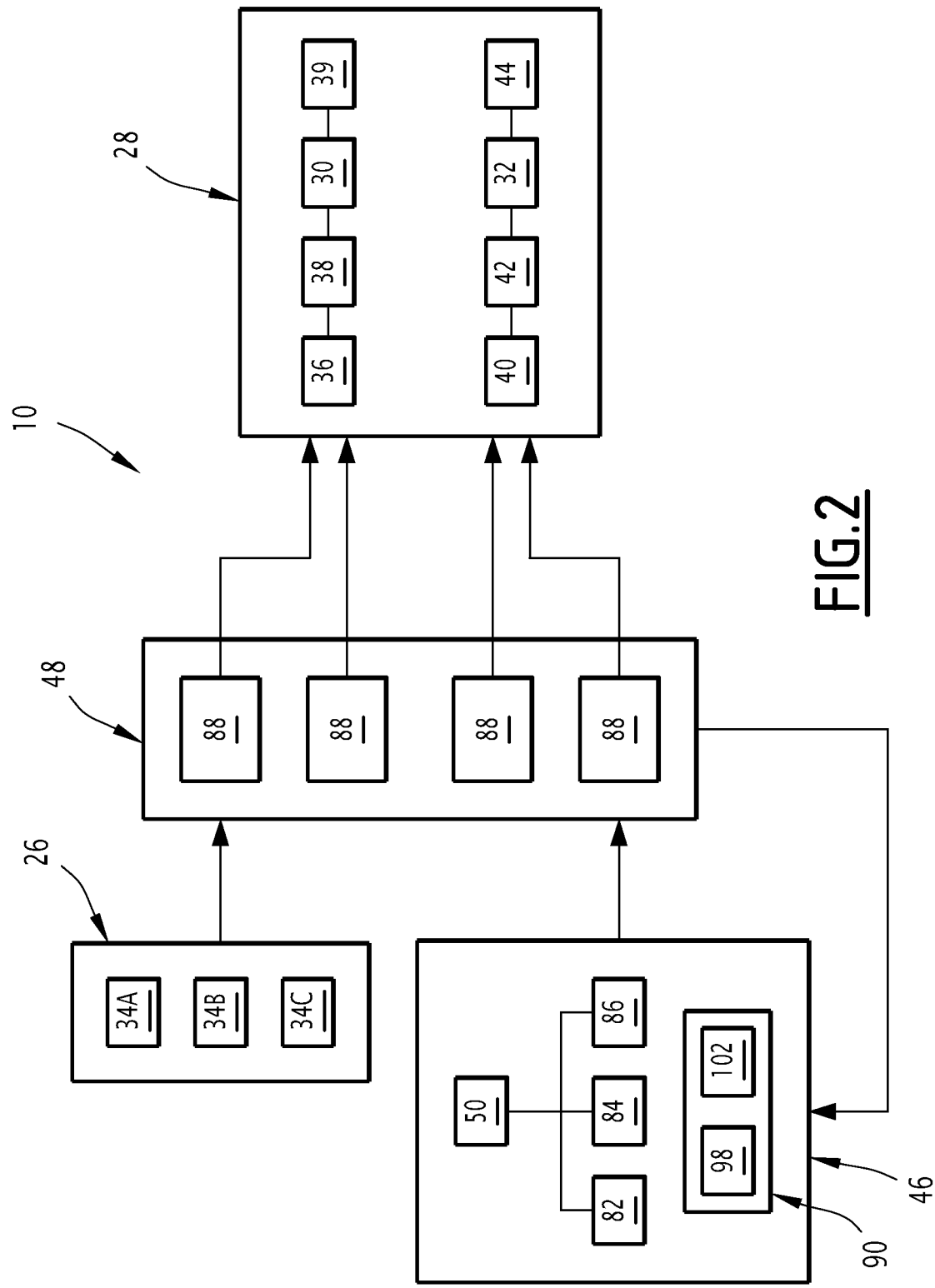
FIG. 2 is a schematic flowchart of the aircraft of FIG. 1.

An example control system 10 according to the present disclosure, preferably comprised within an aircraft 12, is schematically depicted in FIGS. 1 and 2.

The aircraft 12, shown in FIG. 1, is for example a civilian passenger aircraft, in particular a business aircraft, or a military aircraft.

The aircraft 12 generally comprises a fuselage 14 from which an airfoil 16 extends.

The airfoil 16 comprises, for example, two wings 20 extending on either side of the fuselage 14. Each wing 20 has a leading edge 22 and a trailing edge 24.

The aircraft 12 extends along a longitudinal axis.

The aircraft 12 has a cockpit 18 suitable for receiving at least one pilot, the cockpit 18 being bounded by the fuselage 14.

The aircraft 12 further comprises at least one engine, and a flight control system comprising at least one throttle lever operable by a pilot to control the engine's thrust.

The aircraft 12 comprises a system 26 of sensors for the flight parameters of the aircraft 12.

The aircraft 12 comprises a high lift assembly 28 comprising trailing edge flaps 32 and optionally leading edge slats 30.

Each sensor of the system 26 is adapted to measure at least one flight parameter of the aircraft 12 and to output a signal representative of a current value of said flight parameter.

The flight parameter is for example a position, speed and/or altitude.

The flight parameter is also for example a heading, a route, a speed vector, a ground speed, and/or an acceleration.

The flight parameter is furthermore for example an air speed, a Mach speed, and/or total and static temperatures of the aircraft 12.

The sensor system 26 comprises for example at least one inertial sensor 34A.

Each inertial sensor 34A is for example an inertial unit possibly hybridised with a satellite positioning system, in particular GPS.

The sensor system 26 further comprises, for example, at least one air data sensor 34B.

Each air data sensor 34B comprises, for example, pitot probes.

The sensor system 26 further comprises for example at least one attitude and heading reference sensor 34C.

Each attitude and heading reference sensor 34C consists, for example, of at least one gyrometer, at least one accelerometer, and/or at least one magnetometer which detect accelerations and magnetic fields experienced by the aircraft 12. Each attitude and heading reference sensor 34C is, for example, formed by micro-electro-mechanical systems (or MEMS).

The high lift assembly 28 is intended to modify the lift coefficient of the aircraft 12. For example, the high lift assembly 28 is intended to increase the lift coefficient, particularly at low speeds, to lower the stall speed.

The high lift assembly 28 preferably comprises at least one, advantageously at least two, and for example three, slats 30 per wing 20 of the aircraft 12.

Each slat 30 has the function of delaying the stalling of air streams on the upper surface of the wing 20.

Each slat 30 is located on the leading edge 22 of one of the wings 20.

Each slat 30 is movable relative to a wing 20 of the aircraft 12 between a near position on the wing 20 and an extreme far position.

Said near position of the wing 20 and far position preferably form extreme positions of movement of the slat 30.

Each slat 30 may also, for example, be immobilised in one or more intermediate positions between the near position and the extreme far position.

The near position preferably corresponds to a retracted position in which the slat 30 does not protrude from the wing 20.

The high lift assembly 28 comprises a slat control unit 36 and, for each slat 30, at least one actuator 38 adapted to move the slat 30 between the near position and the far position.

Each actuator 38 is for example a screw actuator.

The control unit 36 in such a case is a motor unit. Each actuator 38 is connected to the slat control unit 36 by a mechanical transmission chain.

Alternatively, each actuator 38 is a hydraulic cylinder.

The control unit 36 in such a case is a common hydraulic control unit, suitable for distributing hydraulic power to each actuator 38 via a network of hydraulic lines.

The slat control unit 36 is suitable for jointly setting all the slats 30 in motion.

The slat control unit 36 is adapted to receive a lift control vector from the lift control unit 48, as described in more detail below, and to actuate each slat 30 actuator 38 accordingly.

The slat control unit 36 is adapted to hold each actuator 38, and thus each slat 30, in a controlled position, for example by means of a brake.

Preferably, the high lift assembly 28 further comprises, for each slat 30, a position sensor 39 adapted to emit a signal representative of the position of the slat 30 at least when the slat 30 is in a near and a far position.

Said position sensor 39 thus comprises, for example, two micro-position switches associated with the near and far positions, respectively.

Preferably, the high lift assembly 28 comprises at least one flap 32 per wing 20, advantageously at least two flaps 32 per wing 20 of the aircraft 12.

Each flap 32 is located on the trailing edge 24 of one of the wings 20.

Each flap 32 is movable relative to a wing 20 of the aircraft 12 between at least one position near the wing 20, preferably a first intermediate position, advantageously a second intermediate position, and an extreme far position, said positions being distinct.

Said near position and far position preferably form extreme positions of movement of the flap 32.

The number of intermediate position(s) between the two extreme positions is non-limiting. The number of different intermediate position(s) can therefore be zero, one, two, three, four, five, six, seven, eight, and even more than eight.

The near position preferably corresponds to a retracted position in which the flap 32 does not protrude from the wing 20.

Advantageously, for each flap 32, said positions of the flap 32, other than the near position, define distinct steering angles.

From the near position to the far position, the flap 32 has an increasing downward tilt.

The steering angle is for example defined from the longitudinal axis of the aircraft 12 or from the wing chord 20.

In one example, the first intermediate position defines a steering angle of between 7° and 11°, for example 10°, the advantageous second intermediate position defines a steering angle of between 15° and 25°, for example 20°, and the far position defines a steering angle of between 35° and 45°, for example 40°.

For example, for each flap 32, the high lift assembly 28 comprises a control unit 40 and at least one actuator 42 adapted to move the flap 32 between said positions.

Each actuator 42 is connected to said associated control unit 40.

Each actuator 42 is for example an electromechanical cylinder.

Each control unit 40 in such a case is an electromagnetic motor unit.

Each control unit 40 is suitable for setting the associated flap 32 in motion.

Each control unit 40 is adapted to receive a lift control vector from the lift control unit 48, as described in more detail below, and to actuate each the associated actuator 42 of the flap 32 accordingly.

Each control unit 40 is adapted to hold the associated actuator 42, and thus the flap 32, in a controlled position, for example by means of a brake.

Preferably, the high lift assembly 28 further comprises, for each flap, a position sensor 44 adapted to emit a signal representative of the position of the flap 32 at least when the flap 32 is in one of said positions.

The high lift assembly 28 is controllable in at least two different aerodynamic configurations, preferably at least three different aerodynamic configurations, and advantageously in at least four different aerodynamic configurations.

The number of different aerodynamic configurations is non-limiting. The number of different aerodynamic configurations can therefore be one, two, three, four, five, six, seven, eight, nine, ten and even more than ten.

The different aerodynamic configurations each have different increasing lift.

The aerodynamic configurations include, for example:
a low-lift aerodynamic configuration SF0, in which each slat 30 and flap 32 is in the near position,
preferably, a first intermediate lift aerodynamic configuration SF1, in which each slat 30 is in the extreme far position and each flap 32 is in the first intermediate position,
advantageously, a second intermediate lift aerodynamic configuration SF2, in which each slat 30 is in the extreme far position and each flap 32 is in the second intermediate position, and
a high-lift aerodynamic configuration SF3, in which each slat 30 and flap 32 is in the extreme far position.

For example, the number of different aerodynamic configurations here is four.

In variants, the first intermediate lift aerodynamic configuration SF1 and/or the second intermediate lift aerodynamic configuration SF2 is/are omitted.

More than four aerodynamic configurations can also be provided for the high lift assembly, the aerodynamic configurations in such a case including for example at least the above SF0 to SF3 configurations.

Each of these aerodynamic configurations form stable configurations over time. In other words, as long as the high lift assembly 28 is not controlled into another aerodynamic configuration, the high lift assembly 28 remains in the current aerodynamic configuration.

Specifically, for example, when the high lift assembly 28 is in each of said aerodynamic configurations, the brake on the slat control unit 36 holds each slat 30 in position, and the brake on each control unit 40 holds each flap 32 in position. Alternatively, the holding is not necessarily implemented by the brakes.

When the high lift assembly 28 is switched from one aerodynamic configuration to another, all flaps 32 are jointly controlled with one another and, similarly, all slats 30 are jointly controlled with one another.

Preferably, each aerodynamic configuration is respectively intended to be implemented during a flight phase of the aircraft 12, the flight phases including for example a take-off phase, a cruise phase, an approach phase, and a landing phase.

The control system 10 is intended to control the lift of the aircraft 12 by controlling the aerodynamic configuration of the high lift assembly 28.

The control system 10 comprises a manual control device 46, operable by a pilot of the aircraft 12.

Preferably, the control system 10 further comprises the aircraft 12 flight parameter sensor system 26 as described above.

Advantageously, the control system 10 further comprises a lift control unit 48.

The manual control device 46 is located in the cockpit 18 of the aircraft 12.

The manual control device 46 comprises at least one movable member 50 and a base body 52.

The member 50 is movable relative to the base body 52. The movable member 50 is adapted to be moved relative to the base body 52 at least between a rest position, a first position and a second position distinct from the first.

The first and second positions preferably define stop positions for the movement of the movable member 50 relative to the base body 52. The movable member 50 is thus in abutment with the base body 52 in each of the first and second positions.

Figure 3:
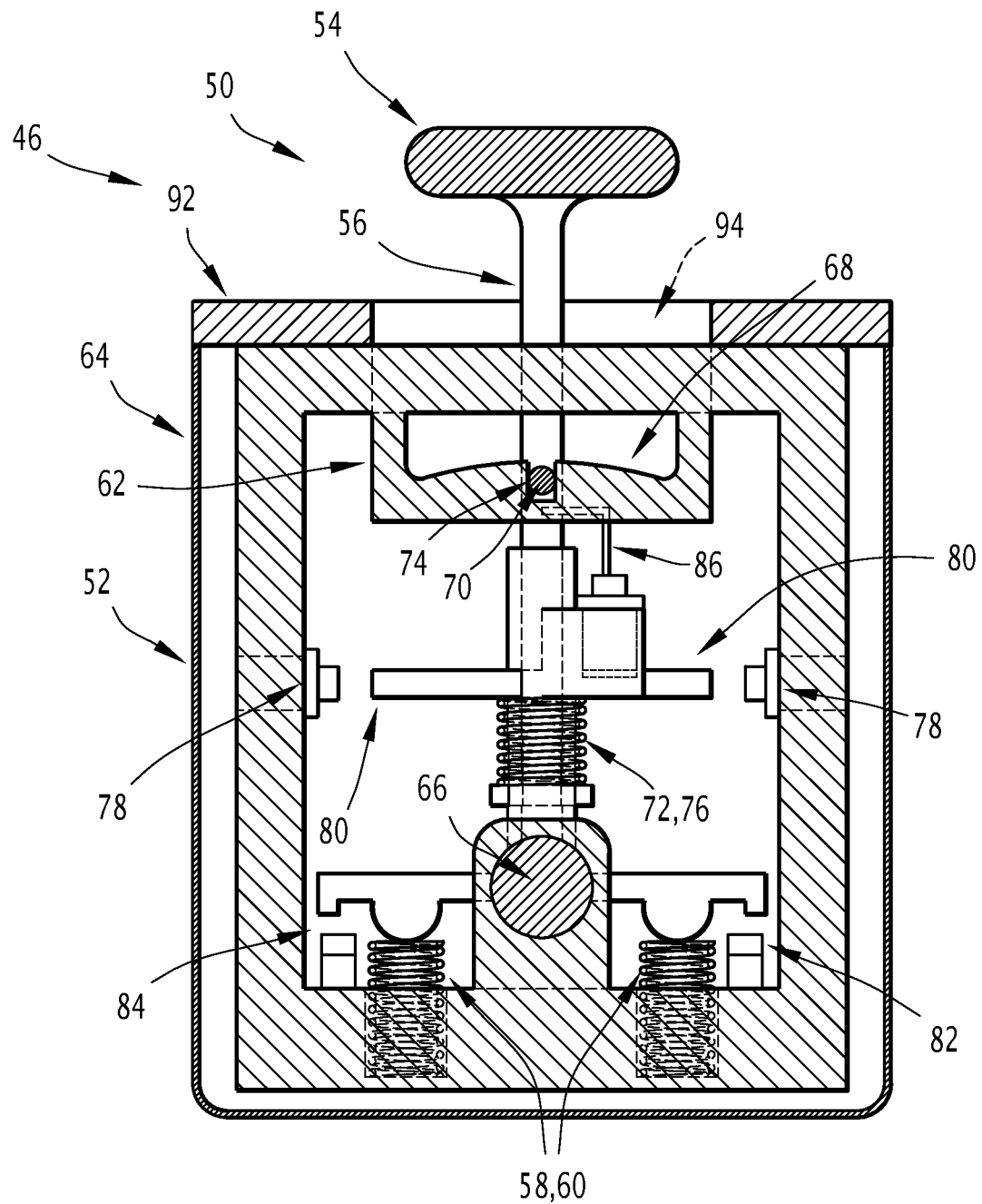
FIG. 3 is a cross-sectional schematic view of an example manual control device of the of control system according to the FIG. 1.
Figure 4:
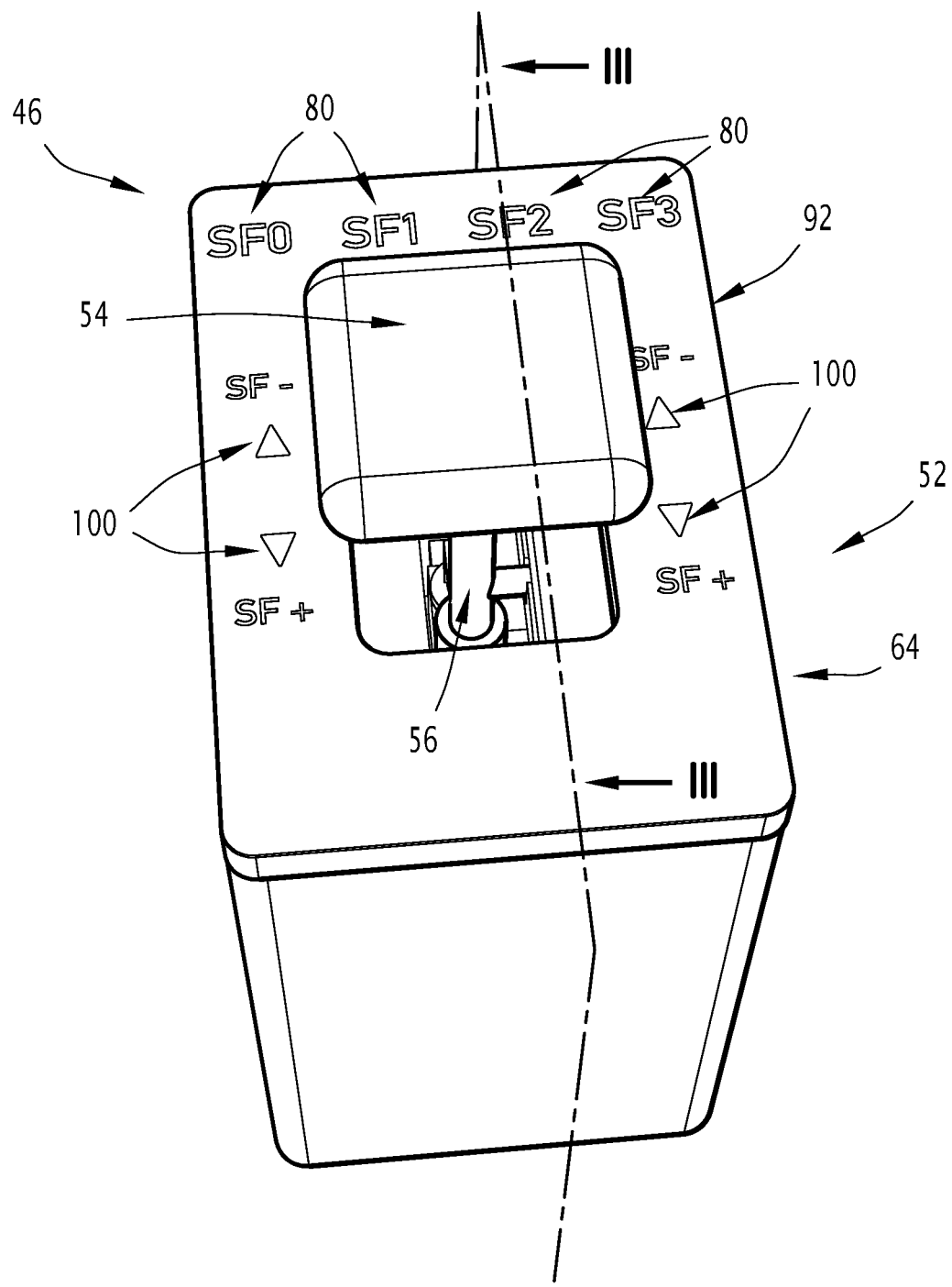
FIG. 4 is a schematic perspective view of the manual control device of FIG. 3.

In the example shown in FIGS. 3 and 4, the manual control device 46 is a joystick and the movable member 50 is a lever.

The lever 50 comprises a handle 54 and a guide body 56 on which the handle 54 is mounted.

The handle 54 is suitable for being gripped by a pilot of the aircraft 12.

In the preferred example in FIG. 3, the lever 50 is angularly movable with respect to the base body 52. Alternatively, the lever 50 is translatable, for example able to move straight, relative to the base body 52.

The lever 50 is suitable for being gripped by the pilot of the aircraft 12 to be moved relative to the base body 52. By such a movement of the lever 50, which corresponds to the actuation of the joystick 46, the pilot aims to command a change in the lift of the aircraft 12 and thus a change in the aerodynamic configuration.

As mentioned above, the lever 50 is adapted to be moved relative to the base body 52 at least between the rest position, the first position and the distinct second position.

An example rest position is illustrated in FIG. 3.

In the example shown in FIG. 3, the rest position is midway between the first and second positions. However, the rest position can be any position between the first and second positions, and not necessarily a midway position relative to the first and second positions.

Movement from the rest position to the first position defines a first direction of movement, and movement from the rest position to the second position defines a second, distinct direction of movement.

For example, the second direction of movement is opposite to the first direction of movement.

The movement between the first position and the second position is thus carried out in the same plane of movement.

In this example, the rest position, the first position, and the second position are aligned.

In the example of FIG. 3, the first position corresponds to a rear position and the second position corresponds to a front position.

The terms "front" and "rear" are taken to refer to the longitudinal axis of the aircraft 12. As an indication, the cockpit 18 is at the front of the aircraft 12 relative to the wings 20.

In general, the manual control device 46 comprises a resilient return device 58 for the movable member 50 in the rest position.

The resilient return device 58 is adapted to exert a return force on the movable member 50 when the movable member 50 is moved from the rest position.

A pilot of the aircraft 12 is thus able to move the movable member 50 from the rest position to each of the first and second positions by exerting a force on the movable member 50 towards said positions, the force being exerted against the return force of the return device 58.

The rest position forms the only stable position of the movable member 50 relative to the base body 52.

In the example of FIGS. 3 and 4 where the manual control device 46 is a lever, the resilient return device 58 comprises at least one spring 60 connected to the guide body 56 of the lever 50 and the base body 52.

In the example shown in FIG. 3, the resilient return device 58 comprises two identical springs 60, arranged such that a first of the springs 60 is compressed when the lever 50 is in the first position and the second of the springs 60 is compressed when the lever 50 is in the second position.

In one embodiment, the return device 58 comprises a single spring 60. The single spring 60 is in such a case for example arranged to be compressed when the lever 50 is in the first position and/or in the second position, the single spring 60 having a rest length corresponding to its length when the lever 50 is in the rest position.

The base body 52 comprises a support structure 62.

The base body 52 further comprises for example a box 64 in which the support structure 62 is arranged.

The support structure 62 supports the lever 50.

In the example shown in FIG. 3, the support structure 62 has a joint with the lever 50, in particular with the guide body 56 of the lever 50, the joint forming a pivot point 66 of the lever 50 relative to the base body 52.

The angular displacement of the lever 50 is performed relative to this pivot point 66.

For example, the base body 52 defines at least one guide groove 68.

The guide groove 68 is defined in the support structure 62 of the base body 52.

The guide groove 68 is intended to guide the movement of the lever 50 relative to the base body 52.

In the illustrated example, the guide groove 68 has an arcuate shape, as the lever 50 is angularly movable relative to the base body 52. The arcuate shape has a centre corresponding to said pivot point 66.

Alternatively, the groove has a rectilinearly elongated shape, if the lever 50 is translatable in a straight line with respect to the base body 52.

The guide body 56 of the lever 50 extends inside and outside the box 64.

The guide body 56 comprises a guide finger 70 accommodated in the guide groove 68.

In an advantageous embodiment, the joystick 46 comprises a device 72 for locking the lever 50 in the rest position.

The locking device 72 comprises a notch 74 defined in the guide groove 68. The notch 74 is suitable for receiving the guide finger 70 when the lever 50 is in the rest position.

The locking device 72 further comprises a resilient return system 76 for the guide finger 70 in the notch 74.

The resilient return system 76 exerts a return force on the lever 50, said return force passing through the notch 74, so as to force the guide finger 70 into the notch 74.

The resilient return system 76 comprises, for example, at least one spring connected to the guide body 56 of the lever 50 and the base body 52.

The spring of the resilient return system 76 is aligned with the notch 74.

The locking device 72 is thus suitable for locking the lever 50 in the rest position. A pilot of the aircraft 12 is thus able to unlock the lever 50 from the rest position by exerting a force on the lever 50 in the opposite direction to the return force of the return system 76.

The force required by the pilot to unlock the lever 50 allows the guide finger 70 to move out of the notch 74.

Preferably, the force required by the pilot to unlock the lever 50 is directed upwards.

In the example of FIGS. 3 and 4, the joystick 46 comprises, for each of the first and second positions, at least one magnet 78 integral with either the lever 50 or the base body 52, the magnet 78 being adapted to exert an attractive force on a contact region 80 of the other of the lever 50 and the base body 52.

In particular, said contact region 80 is a region of the other of the lever 50 and the base body 52 able to come into contact with the magnet 78, when the lever 50 is in the first or second position.

In other words, for each of the first and second positions, said contact region 80 and the magnet 78 form a stopping pair for the lever.

The contact region 80 is for example at least partly made of metal.

In the example illustrated in FIG. 3, each magnet 78 is rigidly connected to the base body 52. The contact region 80 is a region of the lever 50, in particular a region of the guide body 56 of the lever 50.

The attractive force exerted by each magnet 78 is less than a return force exerted by the resilient return device 58 of the lever 50.

Thus, even when the lever 50 is in the first or second position, the lever 50 is urged towards the rest position, in the absence of pilot input to the lever 50.

When the pilot moves the lever 50 from the rest position to either the first or second position, the sense of force is provided at least by the attractive forces of the magnets 78 and the return device 58.

The difference in behaviour, notably linear for the return device 58 and pseudo-quadratic for each magnet 78, makes it possible to provide an end-of-stroke detent feel.

The manual control device 46 is configured to output at least one signal representative of the position, for example angular, reached by the movable member 50 relative to the base body 52, when the movable member 50 reaches either the first or second position, to switch the high-lift assembly 28 between two of the aerodynamic configurations.

This signal is representative of the change in lift, and therefore the change in aerodynamic configuration, that the pilot wishes to control.

In particular, the transition of the high lift assembly 28 between two of the aerodynamic configurations is controlled according to the position reached by the movable member 50 between the first and second positions.

More specifically, the manual control device 46 is configured, when the movable member 50 reaches the first position from the rest position, to output at least one signal representative of the reaching of the first position to change the high lift assembly 28 from a current aerodynamic configuration to another of the aerodynamic configurations having a lift greater than the current aerodynamic configuration.

Additionally, the manual control device 46 is configured, when the movable member 50 reaches the second position from the rest position, to output at least one signal representative of the reaching of the second position to change the high lift assembly 28 from a current aerodynamic configuration to another of the aerodynamic configurations having a lift less than the current aerodynamic configuration.

In other words, the first direction of movement of the movable member 50 (in this example, backwards) is associated with an increase in lift, and the second direction of movement (in this example, forwards) is associated with a decrease in lift.

Advantageously, the manual control device 46 comprises a system for detecting 82 the movable member 50 in the first position and a system for detecting 84 the movable member 50 in the second position.

The manual control device 46 preferably further comprises a system for detecting 86 the movable member 50 in the rest position.

The manual control device 46 emits each signal representative of the position reached by the movable member 50 with respect to the base body 52 via said detection systems 82, 84, 86.

Each detection system 82, 84, 86 comprises at least one position sensor, advantageously a redundancy of at least two position sensors, preferably a redundancy of at least three position sensors, for example a redundancy of four position sensors.

For each detection system 82, 84, 86, each position sensor of the detection system 82, 84, 86 is adapted to send in parallel a signal representative of the position reached by the movable member 50 with respect to the base body 52, when the movable member 50 reaches the position associated with the detection system 82, 84, 86.

Each position sensor comprises, for example, a micro switch.

In a preferred embodiment, the lift control unit 48 is able to control the high lift assembly 28.

The lift control unit 48 is connected to the high lift assembly 28 and to the manual control device 46 (in the above example to the joystick 46).

As shown in FIG. 1, the lift control unit 48 is interposed between the manual control device 46 and the high lift assembly 28. Thus, there is no direct connection between the manual control device 46 and the high lift assembly 28.

The lift control unit 48 is a Digital Flight Command System (DFCS).

The lift control unit 48 is configured to receive, over time, each representative signal from the manual control device 46 and the signals from the sensors of the sensor system 26.

In a preferred embodiment, the control unit 48 is adapted to receive and store in at least one memory a succession of signals representative of the position reached by the movable member 50 over time.

In particular, the sensors of the sensor system 26 are connected to the lift control unit 48, in order to deliver at each moment the current values of the flight parameters they measure to the lift control unit 48, for example at a frequency greater than or equal to 50 Hz.

In general, the lift control unit 48 is configured to generate at least one lift control vector of the high lift assembly 28 from at least one lift control law, having as input data at least each signal received from the manual control device 46 and/or the sensors of the sensor system 26.

The lift control unit 48 is in such a case configured to send a signal comprising the generated lift control vector to the high lift assembly 28.

In a preferred embodiment, as illustrated in the example in FIG. 1, the lift control unit 48 comprises at least four redundant lift control computers 88. Alternatively, the control unit 48 comprises only one, or less than four, or more than four.

Each lift control computer 88 comprises, for example, a processor and a memory containing software modules or applications suitable for execution by the processor to perform the functions of the computer 88 described below. Alternatively, each lift control computer 88 is implemented as programmable logic components or dedicated integrated circuits to perform the functions of the computer 88 described below.

Each lift control computer 88 is connected to the manual control device 46 and the sensor system 26.

In particular, each lift control unit 88 is configured to receive at least each representative signal from the manual control device 46 and the signals from the sensors of the sensor system 26.

Each lift control computer 88 is configured to generate in parallel a lift control vector from at least said lift control law, which has as input data at least each signal received from the manual control device 46 and/or the sensors of the sensor system 26.

Here and hereafter, "control vectors generated in parallel" are control vectors which have been generated by the lift control computers 88 from the same input data values in the control law.

In particular, they are produced for the same position of the movable member 50, relative to the base body 52, of the manual control device 46 operated by the pilot and/or for the same current values of the flight parameters measured by the sensors of the system 26.

The control vectors produced in parallel by the lift control computers 88 are identical, unless there is an error in the production of at least one of the computers 88, ignoring any asynchronism.

Each generated control vector comprises a flap 32 actuator 42 setpoint, to be applied by each flap 32 control unit 40, and optionally a slat 30 actuator 38 setpoint, to be applied by the slat control unit 36.

Each actuator setpoint contains information to enable the relevant control groups 36, 40 to know the extent to which to control the actuators 38, 42 to ensure that the high lift assembly 28 achieves the ordered aerodynamic configuration.

In the preferred example where at least one of the sensing systems 82, 84, 86 of the movable member 50 in the first position, in the second position and in the rest position comprises a redundancy of at least two position sensors, each lift control computer 88 is then configured to select one of the parallel signals received by these redundant position sensors, for example by centrally voting on said received parallel signals.

Centralised voting is for example performed by majority, or weighted-average, or median determination algorithms.

The selected signal then forms one of the inputs to the control law.

Furthermore, advantageously, when the control unit 48, and therefore each control computer 88, receives two consecutive signals from the manual control device 46 representative of the same position reached by the movable member 50, the control unit 48 is configured to disregard the second of the two consecutive signals, if no signal representative of reaching the rest position is interposed between the two consecutive signals.

This provides security in the manual control of the lift against possible unintentional double movements by the pilot on the manual control device 46.

Advantageously, the lift control unit 48 is able to generate lift control vectors from a plurality of distinct lift control laws.

Each control law is for example stored in the memory of each lift control computer 88.

At least one of the lift laws is a manual control law.

The manual control law input data includes at least data representative of the position of the movable member 50 of the manual control device 46 operated by the pilot.

Preferably, the manual control law is suitable for modulating the commands entered by the pilot when operating the manual control device 46.

The manual control law input data then further comprises at least data representative of the current values of the flight parameters measured by the sensors of the system 26.

Generally speaking, for each possible aerodynamic configuration into which the high lift assembly 28 is suitable to change from the current aerodynamic configuration, the control unit 48, and thus each computer 88, is thus configured to determine an authorisation or prohibition to change to the possible aerodynamic configuration depending on signals received from the sensors of the sensor system 26.

This authorisation or prohibition is for example determined by the manual control law.

Thus, for example, the manual control law is suitable for applying overspeed protection and/or stall avoidance to the aircraft 12.

The overspeed protection is, for example, a prohibition of transition to a possible aerodynamic configuration where the flaps 32 are in a position other than the near position, when the current airspeed of the aircraft 12 is above a predetermined speed limit. The predetermined speed limit is for example 250 kt (about 463 km/h).

Preferably, the lift control unit 48 also has automatic functions for controlling the high lift assembly 28.

At least one of the lift laws is an automatic control law.

The automatic control law is advantageously implemented as a priority by the lift control unit 48, in preference to the manual control law.

The automatic control law is suitable for automatically generating lift control vectors solely from the signals received from the sensors of the sensor system 26.

By "automatic" and "automatically" it is meant that no actuation of the manual control device 46 by the pilot is taken into account in the generating of the lift control vectors.

For example, the automatic control law is adapted to automatically generate lift control vectors according to a flight phase of the aircraft 12.

The automatic control law is suitable for determining the current flight phase.

Each flight phase is characterised, for example, by particular sensor data values of the sensor system 26. Thus, each current flight phase which the aircraft 12 is in is associated with a set of sensor data values.

Lift control vectors generated in relation to a flight phase include, for example, controlling a transition of the lift assembly from the current aerodynamic configuration to the low-lift aerodynamic configuration SF0 in a take-off flight phase.

Lift control vectors generated in relation to a flight phase also include, for example, controlling a transition of the lift assembly from the current aerodynamic configuration to the high-lift aerodynamic configuration SF3 in an approach flight phase.

For example, in the event of a go-around of the aircraft engine 12, the automatic control law is also adapted to automatically generate lift control vectors controlling the transition of the lift assembly from the current aerodynamic configuration to the low-lift aerodynamic configuration SF0.

Other examples of automatic control are, of course, possible by the skilled person and will not be described here.

After each control vector has been generated, each lift control computer 88 is configured to send a signal in parallel to the flap and slat control units 36, 40, the signal comprising the generated lift control vector.

Each control unit 36, 40 in this case is for example configured to select one of the parallel signals received by the redundant lift control computers 88, for example by centralised voting on said received parallel signals.

Centralised voting is for example performed by majority, or weighted-average, or median determination algorithms.

Furthermore, in a preferred embodiment, the control system 10 provides a visualisation of the control status to a pilot of the aircraft 12.

The manual control device 46 comprises a visual indication device 90 adapted to present to a pilot of the aircraft 12 a visual indication representative of the aerodynamic configuration controlled by the generated control vector.

The visual indication device 90 responds to the instinctive need of a pilot of the aircraft 12 to look at the handled control member to see the controlled configuration.

For this purpose, the control unit 48 is configured to send a signal representative of the generated control vector to the manual control device 46.

The visual indication device 90 is adapted to receive and process each signal representative of the generated control vector.

The visual indication device 90 comprises, for example, means for processing each signal representative of the generated control vector, for example a processor and associated memory.

The visual indication device 90 is configured to determine, from each control vector processed, the controlled aerodynamic configuration.

The memory is suitable for storing a history of aerodynamic configurations achieved by the high lift assembly 28.

In the example shown in FIG. 4, the visual indication device 90 comprises a plate integral with the base body 52.

The plate 92 is visible to a pilot flying the aircraft 12.

The plate 92 is, for example, supported on an upper surface of the base body 52.

The plate 92 is, for example, flat.

The movable member 50 protrudes from the plate 92.

In the example shown in FIGS. 3 and 4, where the movable member 50 is a lever, the plate 92 delimits a hole 94 through which the lever 50 passes, in particular through which the guide body 56 of the lever 50 passes. The hole 94 in the plate 92, through which the lever 50 passes, is suitable for allowing the lever 50 to move between the first and second positions.

The plate 92 has markers 96.

Each marker 96 is associated with one of the aerodynamic configurations.

The markers 96 are here aligned and, for example, arranged in front of the movable member 50.

Each marker 96 is for example formed by at least one opening in the board 92, the aperture drawing a pattern representative of the aerodynamic configuration with which the marker 96 is associated, and by a controllable light 98 disposed below the pattern.

In the example shown in FIG. 4, the pattern drawn by the opening of each marker 96 is chosen from the abbreviations SF0, SF1, SF2 and SF3.

Each marker 96 is adapted to be controlled to switch between at least one on configuration and one off configuration.

The configuration of each marker 96 is for example controlled by the processor of the visual indication device 90.

In the off configuration, no light is emitted by the marker. In particular, no light is emitted by the light 98.

In the illuminated configuration, the marker 96 emits a light intensity. In particular, the light intensity in such a case is for example constant over time. The light intensity is produced by the controlled light 98.

The intensity emitted by the light 98 is, for example, magenta in colour.

In this example, the visual indication device 90 is adapted to present said visual indication representative of the commanded aerodynamic configuration by controlling the switch to the illuminated configuration of the marker 96 associated with the commanded aerodynamic configuration.

In addition, the visual indication device 90 is adapted to present said visual indication representative of the commanded aerodynamic configuration by jointly controlling each other marker 96 associated with the uncommanded aerodynamic configurations to switch to the off configuration.

Thus, each marker 96 can change configuration as a result of manual intervention by the pilot on the manual control device 46, or as a result of the intervention of an automatic function acting on the slats 30 and the flaps 32.

In a preferred embodiment, the visual indication device 90 informs a pilot of a transient state of the high lift assembly 28, i.e. when the flaps 32 (or flaps 32 and slats 30) are being moved to the respective commanded positions corresponding to the commanded aerodynamic configuration.

For this purpose, each marker 96 is furthermore, for example, suitable to be commanded into a transitional on configuration.

In a first example embodiment, the visual indication device 90 informs the pilot of a transient state of the high-lift assembly 28 by flashing each marker 96

The transitional on configuration in such a case is a flashing configuration of the marker 96.

In the transitional on configuration, the marker 96 emits a light intensity that varies over time in a regular manner. In particular, the light intensity then varies at a predetermined frequency.

Thus, the visual indication device 90 is adapted to control, after receiving a signal representative of the generated control vector, the transition of the associated marker 96 from the off configuration to the transitional on configuration. Then, the visual indication device 90 is adapted to control, after completion of the transition of the high-light assembly 28 to the commanded aerodynamic configuration, the transition of the associated marker 96 from the transitional on configuration to the illuminated on configuration.

For this purpose, the control unit 48 is able to determine a completion of the controlled passage, for example from the position sensors 39, 44 of the slats 30 and the flaps 32. The control unit 48 is in such a case configured to send a signal representative of the completion to the visual indication device 90.

Alternatively or additionally, the visual indication device 90 informs a pilot of a transient state of the high-lift assembly 28 by changing the colour of each marker 96.

To this end, in the illuminated on configuration, the light intensity emitted by the marker 96 has a first predetermined colour. In addition, in the transitional on configuration, the marker 96 emits a light intensity with a predetermined second colour distinct from the first colour.

In a preferred embodiment, the visual indication device 90 is adapted to provide further complementary visual information to a pilot of the aircraft 12. For this purpose, the visual indication device 90 is adapted to display at least one indicator 100 representative of at least one additional item of information.

In a first embodiment, the visual indication device 90 is adapted to present, to a pilot of the aircraft 12 and after receiving a signal representative of the generated control vector, a visual indication representative of a direction of change from the current aerodynamic configuration to the commanded aerodynamic configuration, to a pilot of the aircraft.

In the example shown in FIG. 4, the visual indication device 90 is adapted to have at least two separate lights 100, each light 100 being associated with one of two possible directions of travel respectively.

The direction of change is associated with either an increase in lift or a decrease in lift.

For this purpose, the visual indication device 90 is for example adapted to determine said direction of change, for example by querying the history of aerodynamic configuration stored in the memory of the visual indication device 90.

Each light 100 is for example formed by at least one aperture in the plate 92, the aperture drawing a pattern representative of the aerodynamic configuration with which the light 100 is associated, and by a controllable light 102 disposed below the pattern.

Each pattern drawn is, for example, an arrow or triangle shape.

The two indicators 100 are aligned parallel to the plane of movement of the movable member 50.

The light 100 associated with the direction of lift increase is closer to the first position of the movable member 50 than to the second position. The light 100 associated with the direction of lift decrease is closer to the second position of the movable member 50 than to the first position.

Each light 100 also has, for example, an additional graphic indication of the direction of change associated with the light 100.

In the example in FIG. 4, each graphic indication is either SF− or SF+.

Each light 100 is adapted to be controlled to switch between at least one on configuration and one off configuration.

The configuration of each light 100 is for example controlled by the processor of the visual indication device 90.

In this example, the visual indication device 90 is adapted to present said visual indication representative of the direction of change from the current aerodynamic configuration to the commanded aerodynamic configuration by commanding at least one of the lights 100 to change from the off configuration to the on configuration.

The LED that is switched from off to on is the one associated with the particular direction of change.

In a second, complementary or alternative embodiment, each light 100 is respectively associated with one of the possible aerodynamic configurations into which the high-lift assembly 28 is suitable to be switched from the current aerodynamic configuration.

Each light 100 is then representative of an authorisation or prohibition to switch to the associated possible aerodynamic configuration.

For this purpose, the visual indication device 90 is adapted to receive, from the control unit 48, the authorisation or prohibition to switch to the possible aerodynamic configuration determined by the control unit 48 according to signals received from the sensors of the sensor system 26.

Advantageously, the visual indication device 90 has redundancy of each indicator 100 on either side of the manual control device 46. This enables visualisation for two pilots at the same time.

In an alternative or additional embodiment, the visual indication device 90 comprises a display, carried by the board 92. The visual display device's 90 own processor is then adapted to display a graphical representation of each signal representative of the generated control vector on the screen.

In a further embodiment or addition, the control system is connected to a cockpit display, the cockpit display being adapted to display on the screen a graphical representation of each signal representative of the generated control vector.

In yet another embodiment or addition, the high lift assembly 28 is devoid of a leading edge slat 30. In other words, none of the different aerodynamic configurations, in which the high lift assembly 28 is suitable for control, involve a leading edge slat 30.

In yet another embodiment or addition, at least one of the flaps 32 of the high lift assembly 28 is a flaperon.

The flaperon in such a case combines the function of an aileron to control the roll of the aircraft, preferably during a cruise phase of the aircraft 12, and the function of a flap to control lift, preferably during at least one take-off or landing phase.

In the example described above, the manual control device 46 is a joystick and the movable member 50 is a lever. However, any other manual control device and any other movable member is conceivable within the scope of the present disclosure. Thus, in each passage above where it makes technical sense, the term "lever" can be replaced by "movable member".

Thus, alternatively, the manual control device 46 is not a joystick, and comprises for example a button as a movable member 50.

The button is preferably a toggle button.

In this alternative, the toggle button is rotatable about an axis of rotation between the rest position, the first position and the second position.

For example, the toggle button comprises a first bearing surface and a second bearing surface.

The first and second bearing surfaces extend respectively in two planes at an angle to each other, each plane being substantially parallel to the axis of rotation.

The first support surface is intended to be pressed to move the toggle button to the first position.

The second support surface is intended to be pressed to move the toggle button to the second position.

Advantageously, in this variant, the resilient return device 58 is a torsion spring or a compression spring assembly.

The toggle button is, for example, placed on one of the side surfaces of the base body 52 so that it can be easily operated by a pilot's thumb placing their (for example right) hand on the base body 52.

In yet another embodiment, the manual control device 46 is not a joystick, and comprises for example a knob as a movable member 50. The knob in such a case comprises a cylindrical part that can be rotated along a central axis of the cylindrical part.

An example of a control method according to the present disclosure of the high lift assembly 28 will now be described.

The method includes providing the control system 10 as described above.

The method comprises actuation of the manual control device 46 by a pilot of the aircraft 12, for example during a flight phase.

In one example, the manual control device 46 is a joystick 46.

Actuation is carried out by moving the movable member 50, i.e. the lever 50 or button or knob, relative to the base body 52 from the rest position to either the first or second position.

By such a movement, the pilot aims to command a change in lift of the aircraft 12, and thus a change in aerodynamic configuration.

In such a case, the method comprises transmitting at least one signal representative of the position reached by the movable member 50 relative to the base body 52, when the movable member 50 reaches either the first or second position, to switch the high lift assembly 28 between two of the aerodynamic configurations of different lifts.

The method further comprises the resilient return of the movable member 50 by the resilient return device 58 from the reached position to the rest position.

In particular, the method in such a case comprises the commanding of the switching of the high lift assembly 28 between two of the aerodynamic configurations according to the position reached by the movable member 50 between the first and second positions.

This command is for example implemented by the control unit 48 as described above.

Thanks to the characteristics described above, it is possible to sequentially control the flap (or slat/flap if applicable) aerodynamic configuration with transparent control of this configuration by the pilot, while avoiding inconsistency between the manual control device, i.e. the joystick 46 for example, and the automatic controls from the control unit 48.

What is claimed is:

1. A control system for a high lift assembly comprising at least one flap of a trailing edge of an aircraft, the high lift assembly being controllable into at least two different aerodynamic configurations of different lift, the control system comprising:
a manual control device operable by an aircraft pilot, the manual control device comprising at least one movable member and a base body, the movable member being movable relative to the base body;
the movable member being movable relative to the base body between positions including a rest position and a distinct first position and second position, the manual control device comprising a device for resiliently returning the movable member to the rest position, the manual control device being suitable for emitting at least one signal representative of the position reached by the movable member with respect to the base body, when the movable member reaches either the first position or the second position, in order to cause the high lift assembly to switch between two of the aerodynamic configurations,
wherein the first and second positions define stop positions for the movement of the movable member relative to the base body and the rest position forms the only stable position of the movable member relative to the base body.

2. The control system according to claim 1, further comprising a lift control unit, the lift control unit being connected to the manual control device, the lift control unit being configured to generate at least one lift control vector for the high lift assembly, the lift control vector being generated from at least one lift control law, the control law having as input data at least each signal received from the manual control device.

3. The control system according to claim 2, wherein the manual control device comprises a rest detection system for detecting the movable member in the rest position, the rest detection system comprising at least one rest position sensor, the rest position sensor being configured for sending a signal representative of the position reached by the movable member with respect to the base body, when the movable member reaches the rest position;
the lift control unit being configured for receiving and storing in a memory a succession of signals representative of positions reached by the movable member over time, and, when the lift control unit receives two consecutive signals from the manual control device representative of a same position reached by the movable member, the lift control unit is configured so as to disregard the second signal of the two consecutive signals, if no signal representative of reaching the rest position is interposed between the two consecutive signals.

4. The control system according to claim 3, wherein the rest detection system comprises a redundancy of at least two position sensors, each rest position sensor being configured for sending in parallel a signal representative of the position reached by the movable member with respect to the base body, when the movable member reaches the rest position.

5. The control system according to claim 2, wherein the lift control unit is configured to send a signal representative of the generated control vector to the manual control device, the manual control device comprising a visual indication device configured to display, to a pilot of the aircraft, a visual indication representative of the aerodynamic configuration commanded by the generated control vector.

6. The control system according to claim 5, wherein the visual indication device of the manual control device comprises a plate rigidly connected to the base body, the movable member protruding from the plate, the plate having markers,
each marker being respectively associated with one of the aerodynamic configurations and being configured switching between at least one illuminated on configuration and one off configuration,
the visual indication device being configured to display said visual indication by controlling the passage of the marker, associated with the aerodynamic configuration commanded by the generated control vector, to the illuminated configuration.

7. The control system according to claim 6, wherein the control unit is configured to determine whether the high lift assembly has finished switching to the commanded aerodynamic configuration, and each marker is further configured to switch into a transitional on configuration,
the visual indication device being configured to control, after receiving a signal representative of the generated control vector, a transition of the associated marker from the off configuration to the transitional on configuration;
the visual indication device being configured to command, after the high-lift assembly has finished switching to the commanded aerodynamic configuration, the switching of the associated marker from the transitional on configuration to the illuminated on configuration;
wherein the transitional on configuration is a flashing configuration of each marker, and/or each marker is configured to emit a light intensity having a first predetermined color in the illuminated on configuration and having a second predetermined color distinct from the first color in the transitional on configuration.

8. The control system according to claim 5, wherein the visual indication device is configured to display, after receiving a signal representative of the generated control vector, a visual indication representative of a direction of passage from the current aerodynamic configuration to the commanded aerodynamic configuration, to a pilot of the aircraft, for example by commanding the switching of at least one light from an off configuration to an on configuration.

9. The control system according to claim 2, wherein the high-lift assembly is configured to be controlled to switch from a current one of the aerodynamic configurations to at least one other possible aerodynamic configuration of the aerodynamic configurations,
the control system further comprising a sensor system for flight parameters of the aircraft, the lift control unit being connected to sensors of the sensor system, the lift control unit being configured to determine, for each possible aerodynamic configuration, an authorization or prohibition of switching to the possible aerodynamic configuration as a function of signals received from the sensors of the sensor system;
the manual control device comprising a visual indication device configured to display, to a pilot of the aircraft and for each possible aerodynamic configuration, at least one light representative of the determined authorization or prohibition of switching to the possible aerodynamic configuration.

10. The control system according to claim 2, further comprising a sensor system for flight parameters of the aircraft, the lift control unit being connected to the sensors of the sensor system, the control law also having, as input data, signals received from the sensors of the sensor system.

11. The control system according to claim 1, wherein the high lift assembly is configured to be controlled into at least three different aerodynamic configurations of increasing lift;
the manual control device being configured, when the movable member reaches the first position from the rest position, to output at least one signal representative of the reaching of the first position to change the high lift assembly from a current one of the aerodynamic configurations to another of the aerodynamic configurations having a lift greater than the current aerodynamic configuration;
and the manual control device being configured, when the movable member reaches the second position from the rest position, to output at least one signal representative of the reaching of the second position to change the high lift assembly from a current one of the aerodynamic configurations to another of the aerodynamic configurations having a lift less than the current aerodynamic configuration.

12. The control system according to claim 1, wherein the manual control device is a joystick and the movable member is a lever, the base body defining a guide groove and the lever comprises a handle and a guide body on which the handle is mounted, the guide body of the lever comprising a guide finger received in the guide groove.

13. The control system according to claim 12, wherein the manual control device comprises a locking device for locking the lever in the rest position, the locking device comprising a notch defined in the guide groove, the notch being configured to receive the guide finger when the lever is in the rest position, the locking device also comprising a system for resiliently returning the guide finger into the notch.

14. The control system according to claim 1, wherein the manual control device is a joystick and the movable member is a lever, the manual control device comprising, for each of the first and second positions, at least one magnet integral with either the lever or the base body, the magnet being configured to exert an attractive force on a region of the other of the lever and the base body; the attractive force being less than a return force exerted by the resilient return device of the lever toward the rest position.

15. The control system according to claim 1, wherein the manual control device comprises a detection system for detecting the movable member in the first position and a detection system for detecting the movable member in the second position, each detection system comprising a redundancy of at least two position sensors, each position sensor being configured for sending in parallel a signal representative of the position reached by the movable member with respect to the base body, when the movable member reaches either the first position or the second position.

16. A control system for a high lift assembly comprising at least one flap of a trailing edge of an aircraft, the high lift assembly being controllable into at least two different aerodynamic configurations of different lift, the control system comprising:
a manual control device operable by an aircraft pilot, the manual control device comprising at least one movable member and a base body, the movable member being movable relative to the base body;
the movable member being movable relative to the base body between positions including a rest position and a distinct first position and second position, the manual control device comprising a device for resiliently returning the movable member to the rest position, the manual control device being suitable for emitting at least one signal representative of the position reached by the movable member with respect to the base body, when the movable member reaches either the first position or the second position, in order to cause the high lift assembly to switch between two of the aerodynamic configurations,
wherein the control system further comprises a lift control unit, the lift control unit being connected to the manual control device, the lift control unit being configured to generate at least one lift control vector for the high lift assembly, the lift control vector being generated from at least one lift control law, the control law having as input data at least each signal received from the manual control device.

17. The control system according to claim 16, further comprising a sensor system for flight parameters of the aircraft, the lift control unit being connected to the sensors of the sensor system, the control law also having, as input data, signals received from the sensors of the sensor system.

18. The control system according to claim 16, wherein the manual control device comprises a rest detection system for detecting the movable member in the rest position, the rest detection system comprising at least one rest position sensor, the rest position sensor being configured for sending a signal representative of the position reached by the movable member with respect to the base body, when the movable member reaches the rest position;
the lift control unit being configured for receiving and storing in a memory a succession of signals representative of positions reached by the movable member over time, and, when the lift control unit receives two consecutive signals from the manual control device representative of a same position reached by the movable member, the lift control unit is configured so as to disregard the second signal of the two consecutive signals, if no signal representative of reaching the rest position is interposed between the two consecutive signals.

19. The control system according to claim 16, wherein the lift control unit is configured to send a signal representative of the generated control vector to the manual control device, the manual control device comprising a visual indication device configured to display, to a pilot of the aircraft, a visual indication representative of the aerodynamic configuration commanded by the generated control vector.

20. A control system for a high lift assembly comprising at least one flap of a trailing edge of an aircraft, the high lift assembly being controllable into at least two different aerodynamic configurations of different lift, the control system comprising:
a manual control device operable by an aircraft pilot, the manual control device comprising at least one movable member and a base body, the movable member being movable relative to the base body;
the movable member being movable relative to the base body between positions including a rest position and a distinct first position and second position, the manual control device comprising a device for resiliently returning the movable member to the rest position, the manual control device being suitable for emitting at least one signal representative of the position reached by the movable member with respect to the base body, when the movable member reaches either the first position or the second position, in order to cause the high lift assembly to switch between two of the aerodynamic configurations, wherein the high lift assembly is configured to be controlled into at least three different aerodynamic configurations of increasing lift;

the manual control device being configured, when the movable member reaches the first position from the rest position, to output at least one signal representative of the reaching of the first position to change the high lift assembly from a current one of the aerodynamic configurations to another of the aerodynamic configurations having a lift greater than the current aerodynamic configuration;

and the manual control device being configured, when the movable member reaches the second position from the rest position, to output at least one signal representative of the reaching of the second position to change the high lift assembly from a current one of the aerodynamic configurations to another of the aerodynamic configurations having a lift less than the current aerodynamic configuration.

* * * * *